United States Patent
Blair et al.

(10) Patent No.: US 7,106,862 B1
(45) Date of Patent: Sep. 12, 2006

(54) DIGITAL INFORMATION HIDING TECHNIQUES FOR USE WITH DATA STREAMS CARRIED OVER A DATA COMMUNICATION NETWORK

(75) Inventors: James Leroy Blair, San Diego, CA (US); Eric Minghorng Su, Tustin, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 872 days.

(21) Appl. No.: 10/170,994

(22) Filed: Jun. 13, 2002

(51) Int. Cl.
*H04K 1/02* (2006.01)
*H04L 9/18* (2006.01)

(52) U.S. Cl. .................................. 380/256; 380/42
(58) Field of Classification Search ................ 380/42, 380/256
See application file for complete search history.

(56) References Cited

U.S. PATENT DOCUMENTS

| | | | |
|---|---|---|---|
| 6,430,159 B1* | 8/2002 | Wan et al. ................ | 370/246 |
| 2003/0079222 A1* | 4/2003 | Boykin et al. ............ | 725/31 |
| 2004/0199772 A1* | 10/2004 | Kwan ....................... | 713/176 |
| 2005/0094640 A1* | 5/2005 | Howe ....................... | 370/395.1 |

* cited by examiner

*Primary Examiner*—Matthew Smithers
(74) *Attorney, Agent, or Firm*—INCAPLAW; Terrance A. Meador

(57) ABSTRACT

A data communication system transports a sequence of digital data frames that convey client input data encoded with secondary data. The system can utilize known, proprietary, or future techniques for digital data encoding, digital watermarking, data encryption, or the like. The secondary data can be frame alignment data, private data intended only for certain destination devices, and/or other data types. In a practical embodiment, the data frames are compliant with optical transport networks.

32 Claims, 8 Drawing Sheets

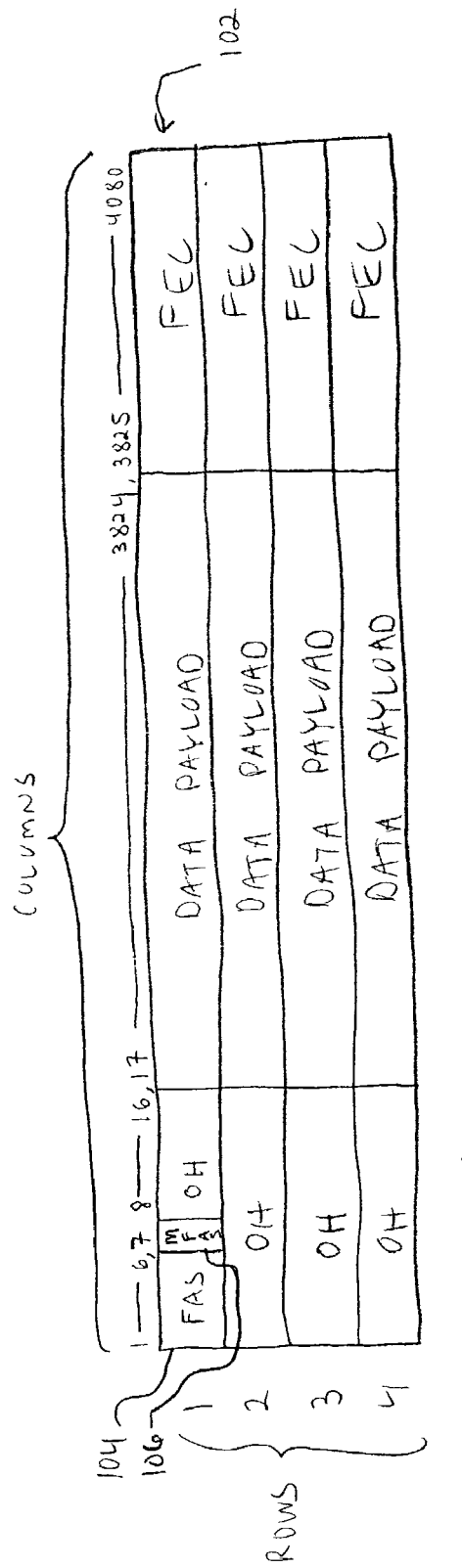
FIG. 1 - PRIOR ART
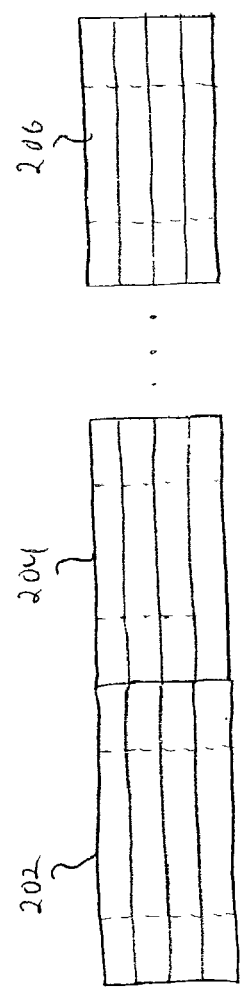
FIG. 2 - PRIOR ART

DIGITAL INFORMATION HIDING TECHNIQUES FOR USE WITH DATA STREAMS CARRIED OVER A DATA COMMUNICATION NETWORK

FIELD OF THE INVENTION

The present invention relates generally to data communication systems. More particularly, the present invention relates to the application of digital information hiding techniques (such as steganography and digital watermarking) to digital data streams transported by a data communication network.

BACKGROUND OF THE INVENTION

The prior art is replete with digital data communication systems that convey data between system sections or system components. Some data communication systems, such as optical transport networks (OTNs), transmit frame delineated serial streams of digital data, while other systems may transmit format-independent data streams. Conventional SONET/SDH networks transport data frames formatted in accordance with internationally standardized protocols. Generally, a data frame includes a relatively small number of bytes devoted to system overhead (OH), a relatively small number of optional bytes devoted to forward error correction (FEC), and a relatively large number of bytes reserved for the actual client data payload. One specific data frame format utilized by OTNs is the Optical Transport Unit of rate k ($OTU_K$) type set forth in ITU-T Recommendation G.709/Y.1331 (International Telecommunication Union, February 2001). This data frame format is informally referred to as the "digital wrapper" format.

Briefly, each digital wrapper frame contains 16,320 8-bit bytes, six of which form a defined frame alignment signal (FAS) that occurs at the beginning of each frame. Consequently, the FAS provides a periodic pattern of bits that, when detected by a destination component, serves to align the incoming frames. After the destination component establishes frame alignment, it can process the frame data content including the FEC information (when provided) to compensate for network and channel errors. Frame alignment at the signal destination, however, may be difficult or impossible to achieve if channel noise produces a substantial number of erred bits within the data stream (due to the relatively small number of bytes devoted to the FAS). If the destination component fails to achieve frame synchronization, then the FEC information is rendered useless and all system overhead and client data (erred or not) is relegated to an entirely indiscernible state.

The client data payload contained in a data frame structure may contain sensitive, private, or confidential information. For example, the client data may be encrypted at the data source using any number of conventional encryption techniques. The encrypted client data is then formatted in accordance with a particular data framing scheme (e.g., the digital wrapper format) and sent to the destination component, where the client data is decrypted in accordance with the chosen encryption algorithm. Such known techniques, however, are limited to the protection of the client data payload. Furthermore, conventional data frame transmission schemes do not provide for the covert processing of system overhead and/or frame delineation.

BRIEF SUMMARY OF THE INVENTION

A digital data communication system according to the present invention applies information hiding (utilizing steganographic, digital watermarking, and/or equivalent techniques) to serial data streams handled by the system. For example, an arbitrary data stream into which secret messages (secondary data) are to be added is subjected to a steganographic process that innocuously embeds the message data such that its very existence may be revealed to only a select set of entities privileged or enabled to do so. As another example, a data stream possessing an embedded digital watermark permits ownership identification. Watermarking necessitates additional robustness against attempted watermark removal and/or alteration. In general, the information hidden through watermarking is associated with the digital data stream to be protected or to its owner, while the application of steganographic techniques to a data stream simply hides any added secondary information. In an example system that transmits data frames, one or more digital watermarks can be applied to the payload while all or part of the entire data frame (including the payload) can receive steganographically embedded secondary data. In practical embodiments, steganographically embedded digital data can be utilized to establish frame alignment and/or to facilitate the transmission of private information.

The above and other aspects of the present invention may be carried out in one form by an optical transport network digital data frame structure having a frame length defined by L sequential bytes, where the bytes convey client input data, and secondary data, which may be encoded into the client input data to form encoded digital data. The encoded digital data is distributed among the bytes in the data frame structure.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

FIG. 1 is a diagram of a digital wrapper frame structure;

FIG. 2 is a diagram of a digital wrapper multiframe structure;

DETAILED DESCRIPTION OF A PREFERRED EMBODIMENT

Figure 3:
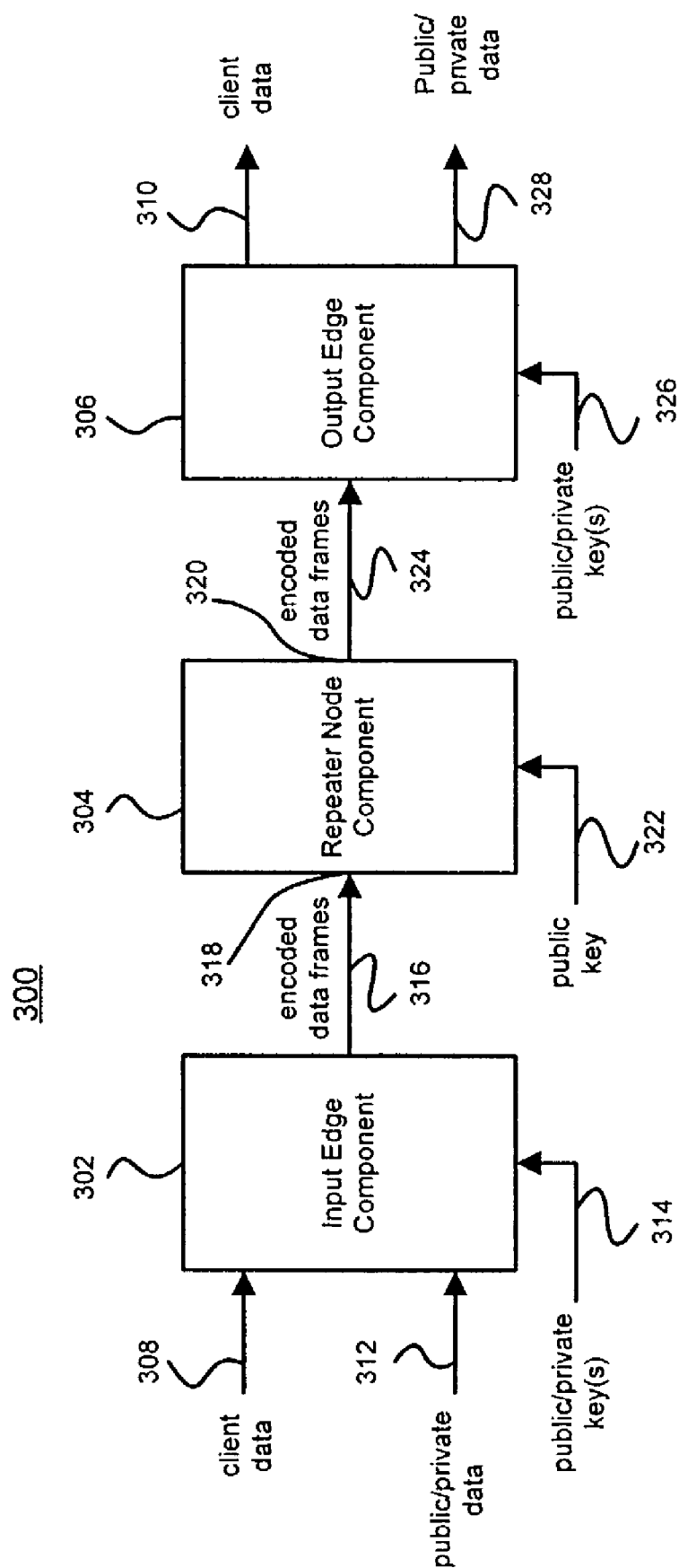
FIG. 3 is a schematic representation of a data communication system configured in accordance with the present invention.

The present invention may be described herein in terms of functional block components and various processing steps. It should be appreciated that such functional blocks may be realized by any number of hardware, software, and/or firmware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for data transmission, signal switching and routing, network control, frame synchronization, data encryption, digital watermarking, error correction, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

The techniques of the present invention may be implemented in a digital communication system that transports data in one or more serial streams between system or network components. The serial data can be format-independent or, as in many practical implementations, the serial data can be formatted into a sequence of data frames. It should be appreciated that the concepts and methodologies described herein can be extended for use with any data frame format. In this regard, although the present invention is not so limited, the example system embodiment described herein transports serial data in the form of digital wrapper data frames.

FIG. 1 is a diagram of a digital wrapper data frame structure 100, as formatted in accordance with ITU-T Recommendation G.709/Y.1331. A practical embodiment of the present invention may process digital wrapper data frames at 40 Gbps Optical Transport Unit ($OTU_{K=3}$). The techniques of the present invention, however, are not limited to the transmission of digital wrapper frames or to the transmission of data at any particular data rate. Indeed, the present invention may be applied in the context of: incoming data formatted in accordance with alternative frame formats; incoming data received at different data rates; reformatting the incoming data for transmission at any desired data rate; and processing incoming data containing any number of frame alignment bytes.

In practice, digital data transmitted via optical transport networks is formatted in accordance with data frame structure 100. In the optical domain, the data contained in data frame structure 100 is transmitted at a nominal rate of 40 Gbps, and any number of such data frame structures can be transmitted in sequence. In this regard, FIG. 2 is a diagram of a digital wrapper multiframe structure 200 having a number of data frames in sequence. In accordance with conventional protocols, multiframe structure 200 includes a first data frame 202, a second data frame 204, and so on, up to and including a last data frame 206 (in accordance with conventional optical transport networks, last data frame 206 corresponds to the 256th data frame in multiframe structure 200). Following last data frame 206, the next multiframe structure begins, starting with data frame number one.

Referring back to FIG. 1, data frame structure 100 contains 16,320 bytes of data; each byte includes eight binary bits. Data frame structure 100 is divided into four rows, each having 4,080 bytes. The first 16 bytes in each row are reserved for overhead data, bytes 17 through 3,824 in each row are utilized for arbitrary payload data (e.g., client data from any number of independent sources), and bytes 3,825 through 4,080 in each row are devoted to optional forward error correction (FEC) data. ITU-T Recommendation G.709/Y.1331 uses the term "column" to refer to the 4,080 byte positions within any given row. In a practical implementation, data frame structure 100 is transmitted left to right, row by row, beginning with first row 102 and ending with the fourth row. The first row of the next data frame is transmitted after the fourth row of the preceding data frame.

The first row 102 in data frame structure 100 contains a frame alignment signal (FAS) 104. As shown in FIG. 1, FAS 104 appears at the beginning of data frame structure 100 (bytes 1–6 in first row 102). FAS 104 is a repeatable and recognizable pattern of bits that is detected by the destination component to establish frame synchronization. Digital wrapper data frame structure 100 utilizes the following pattern (of hexadecimal values) for FAS 104: F6, F6, F6, 28, 28, 28. In accordance with conventional terminology, FAS 104 contains three "A1" bytes followed by three "A2" bytes. Alternatively, any recognizable pattern of bits can be utilized for FAS 104. All other bytes in the frame are scrambled (randomized) in accordance with the digital wrapper standard to enhance FAS uniqueness and detectability. When the optical transport network transmits digital wrapper frames, the receiver establishes frame alignment by periodically detecting FAS 104 at the beginning of each frame. Once frame alignment has been established, the receiver can process the FEC bytes, process the overhead bytes, and extract the data payload in a suitable manner.

The seventh byte in data frame structure 100 is a multiframe alignment signal (MFAS) 106. MFAS 106 is utilized to identify the beginning of each 256-frame multiframe structure, as depicted in FIG. 2. In practical embodiments, MFAS 106 is a recognizable 8-bit pattern that, on a frame sequential basis, increments in value from 00h to FFh (in hexadecimal notation), then repeats. Thus, the digital wrapper structure accommodates a "coarse" alignment of multiframes concurrently with a "fine" alignment of individual frames.

Digital wrapper data frames formatted in accordance with data frame structure 100 can be transmitted and/or received by a number of data communication devices. For example, such data frames can be received, processed, and/or transmitted by a source element such as an input edge component, a destination element such as an output edge component, a network repeater component, switching or routing equipment, or the like. In this regard, FIG. 3 is a schematic representation of a simplified data communication system 300 in which the techniques of the present invention may be implemented; system 300 represents one example implementation of the present invention that employs digital data frames (such data frames may be substantially compliant with ITU-T Recommendation G.709/Y.1331). Briefly, data communication system 300 includes an input edge component 302, a repeater component 304, and an output edge component 306.

Input edge component 302, which resides at the "edge" of the data communication network, obtains client data 308 in the form of one or more client data streams and generates a sequence of data frames containing payload data based upon client data 308. Input edge component 302 may generate data frames having the same (or similar) general format as data frame structure 100. One or more repeater components 304 function to receive and retransmit data frames as they are routed along a network to an output edge component 306. In this regard, repeater component 304 may utilize a number of known methodologies in addition to the specific techniques described in more detail below. Output edge component 306, which resides at the destination "edge" of the data communication network, receives the serial data frames, processes the frames, and extracts one or more client output data streams 310 from the payload data, where the client output data 310 is based upon client input data 308. Ideally, client data 310 represents an error-free duplication of client data 308.

Input edge component 302 may also receive public/private data 312 (which may also be referred to herein as secondary data) and any number of data encoding keys 314, e.g., public and/or private keys. Input edge component 302 utilizes encoding keys 314 to encode frames and multiframes (including client input data 308) with one or more frame alignment signals and/or secondary data 312. Ultimately, input edge component 302 generates a sequence of encoded data frames 316 based upon frame overhead data, client input data 308, FEC data, secondary data 312, and encoding keys 314. Repeater component 304 is configured to receive data frames at an input node 318, process the data frames, and provide processed data frames at an output node 320. In this regard, repeater component 304 may perform FEC to restore the overhead and payload data and "reinsert" FEC data into the processed data frames. As described in more detail below, repeater component 304 may obtain or otherwise utilize data encoding and/or decoding keys 322, e.g., public keys, to decode (or partially decode) the respective input data frames and to encode (or partially encode) the outgoing data frames 324. If repeater component 304 is to perform data frame processing, as in FEC frame data restoration, repeater component 304 will utilize at least one key to detect the frame alignment signal, remove the FAS prior to FEC data correction, and then reapply the FAS for transmission of encoded data frame 324. Output edge component 306 eventually receives data frames and uses any number of data decoding keys 326, e.g. public and/or private keys, to extract client output data 310 and, if applicable, client encoded secondary data and/or public/private (secondary) data 328 from the received data frames.

As used herein, "secondary data" can be in-band or out-of-band data as mentioned above, such as multilevel signaling data, digital watermark data, network control data, overhead data, error correction data, frame alignment data, multiframe alignment data, private client data, network administrator data (e.g., Trail Trace Identifiers (TTIs) specified in ITU-T Recommendation G.709/Y.1331), and any combination thereof. In accordance with one preferred embodiment, the secondary data conveys frame (and/or multiframe) alignment data such that framing information is dispersed within and/or across one or more encoded data frames. The spreading of the frame alignment data throughout the data frame structure augments the ability of system components to perform frame delineation in the presence of highly erred communication channel conditions. Indeed, the use of encoded frame alignment data allows the communication system to convey framing information using a large number of bytes, relative to the FAS and MFAS signals used in standard digital wrapper frames; this characteristic makes the encoded framing information much more discernable in the presence of channel errors. Although applicable to general frame types, such as $OTU_K$ frames, this technique is particularly suitable for use in conjunction with high rate coded (i.e., strong) FEC, because the benefits of strong FEC can only be realized after successful frame alignment and maintenance. In addition, the use of embedded frame alignment signals would obviate the need for dedicated FAS and/or MFAS signals, making currently dedicated framing bytes available for other purposes.

In accordance with another preferred embodiment, the secondary data conveys private data such that the client input data and/or frame data is encoded with the private data. In such an embodiment, the use of private keys ensures that the private data can only be extracted by authorized entities having knowledge of the private keys. This technique facilitates the use of cryptographic key-based processing of sensitive network data. The use of private keys could, for example, deter unauthorized frame and/or multiframe delineation, thus rendering the data stream virtually impossible to decipher by unauthorized entities. In addition, this technique can be utilized to establish multiple "levels" or "classes" that provide different layers of security and data access rights throughout the data communication system.

In a practical implementation, the secondary data can include any number of signals or data patterns received from any number of distinct sources. For example, in FIG. 3, public/private data 312 may represent private data along with a FAS, and keys 314 may include a private key corresponding to the private data and a public key corresponding to the FAS. The client input data 308 and the corresponding data frame can be suitably encoded using both keys such that the private data is conveyed in the encoded client data and the FAS in the encoded data frames 316. Repeater component 304 may have access to only the public key such that it can perform frame alignment and FEC. Output edge component 306 has access to both keys such that it can perform frame alignment and extract the private data from the input data stream. In an alternate embodiment, the client input data 308 is encoded only with private data and, consequently, the data communication system leverages conventional frame alignment techniques to establish frame synchronization. Of course, private data need not be transmitted at all and a given data communication system may utilize the information hiding techniques only for the purpose of frame alignment.

Figure 4:
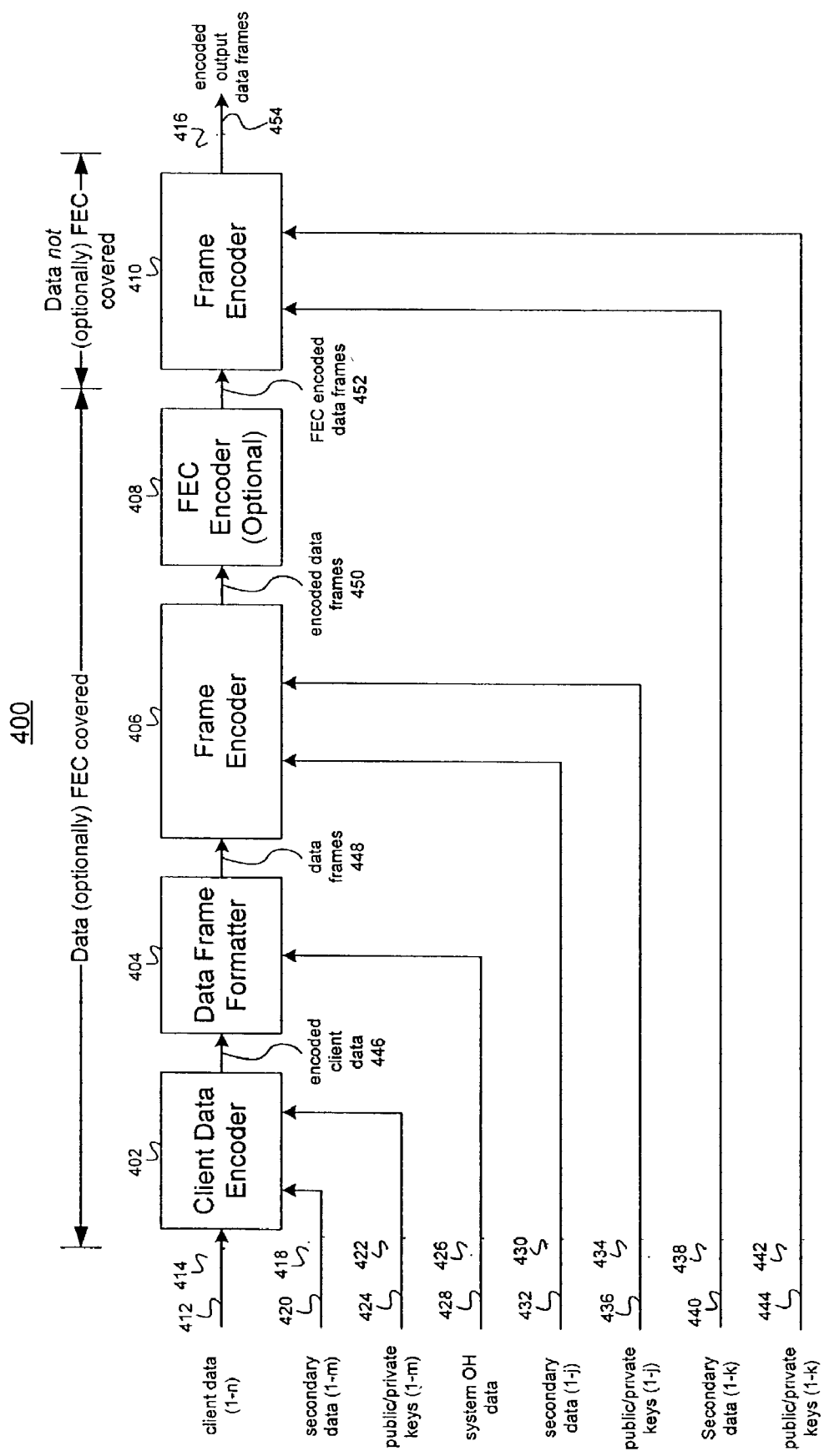
FIG. 4 is a schematic representation of an input edge component suitable for use in the data communication system shown in FIG. 3.

FIG. 4 is a schematic representation of an input edge component 400 suitable for use in data communication system 300 (input edge component 400 is not limited to use in such a data communication system, and system 300 can utilize alternately configured input edge components). Input edge component 400 generally includes a client data encoder 402, a data frame formatter 404, a frame encoder 406, an optional FEC encoder 408, and another frame encoder 410. Input edge component 400 is configured to receive client input data 412 at an input node 414 and to generate, at an output node 416, a sequence of data frames encoded with hidden information. Input edge component 400 may be realized as one or more discrete components or devices; for the sake of clarity, conventional aspects of input edge component 400 (e.g., memory elements, processor elements, logic elements, and the like) are not shown in FIG. 4.

In addition to input node 414, input edge component 400 may include one or more of the following input nodes for receiving various types of data or information: an input node 418 configured to receive secondary data 420; an input node 422 configured to receive one or more encoding keys 424; an input node 426 configured to receive system overhead data 428; an input node 430 configured to receive secondary data 432; an input node 434 configured to receive one or more encoding keys 436; an input node 438 configured to receive secondary data 440; and an input node 442 configured to receive one or more encoding keys 444. As used herein, a "node" means any internal or external reference point, connection point, junction, signal line, wire, or the like at which a given signal, logic level, data pattern, key, or quantity is present. Furthermore, two or more nodes may be combined into one physical element (and two or more signals can be multiplexed, modulated, or otherwise distinguished even though received or output at a common node). The various inputs depicted as single arrows in FIG. 4 are intended to represent one or more distinguishable, distinct, or separate data streams or sources. For example, client data 412 may represent up to n independent input streams, secondary data 420 may represent up to m secondary data streams, encoding keys 424 may represent up to m different public/private keys, and the like.

Client data encoder 402 is coupled to input node 414 such that it receives client input data 412 (or data based on client input data 412). Client data encoder 402 is also coupled to input node 418 such that it receives secondary data 420, and to input node 422 such that it receives encoding key(s) 424. Unless expressly stated otherwise, "coupled" means that one element is connected directly or indirectly to another element, and data transmitted from one element to another element need not remain unmodified or untransformed in transit.

For purposes of this example, client input data 412 represents payload data intended for transport from input edge component 400 to a destination component, such as a repeater component or an output edge component. Client input data 412 can originate from one or more suitable data sources (not shown). The actual content of client input data 412 is unimportant for purposes of the present invention. In a data frame transmission environment, client input data 412 is ultimately conveyed in the payload section of the transported data frames.

For purposes of this example, encoding key(s) 424 represent any number of public encoding keys and/or any number of private encoding keys. As used herein, an "encoding key" refers to a pattern, sequence, or string of digital data that serves as a seed to a digital steganographic or watermarking algorithm, an encryption algorithm, a data encoding algorithm, or the like, the use of which results in the transformation of a given data set (e.g., client data and/or secondary data) into a sequence of encoded digital data. In a preferred practical embodiment, the encoded digital data represents an entirely unique sequence of data that can only be generated from the original data set. Thus, the original data set content can only be revealed to entities possessing the inverse transform key(s). Consistent with their common definitions, a "public key" refers to a key that is published or otherwise made known to multiple entities for general use, and a "private key" refers to a key that is confidentially shared by a number (typically a limited number) of entities.

Client data encoder 402 is suitably configured to generate encoded client data 446 based upon client input data 412, secondary data 420, and encoding key(s) 424. Secondary data 420 may represent, without limitation: watermark data, client originated/linked communication channel(s) operating "network agnostically," or the like. In accordance with one practical embodiment, client data encoder 402 comprises a digital watermarking element, and secondary data 420 comprises private digital watermark data. In such a practical implementation, client data encoder 402 employs private keys to encode client input data 412 with the watermark data. Client data encoder 402 encodes client data 412 with one or more watermark signatures such that any unauthorized attempt to remove the watermark data will corrupt or destroy the foundational client input data 412 and the watermark data itself. In this regard, client data encoder 402 may employ known, proprietary, or future digital watermark and/or signature techniques to encode client data 412 with secondary data 420. For example, client data encoder 402 can leverage a variety of known watermarking, encoding, and/or steganographic techniques (which are utilized in connection with the copyright protection and distribution monitoring of digitally-sampled audio, video, and other multimedia works). More specifically, input edge component 400 can utilize known technologies such as the ImageBridge Watermarking Software Development Kit from Digimarc Corporation. The ImageBridge software contains a set of application libraries and object code that allow developers to utilize digital watermarking capabilities.

Data frame formatter 404 is suitably configured to receive encoded client data 446 from client data encoder 402 and to generate a stream of data frames 448 based upon encoded client data 446 and system overhead data 428. In a non-framed implementation, data frame formatter 404 outputs a stream of serial data that includes client input data 412 (the stream of digital data may also include overhead data and frame alignment data). In the preferred framed implementation, data frame formatter 404 comprises a framer configured to generate digital data frames in response to client input data 412. In a practical embodiment, data frame formatter 404 receives (optionally) encoded client data 446, adds overhead data 428 to the data frame structure, and generates digital data frames 448 that are compliant (or substantially compliant) with optical transport networks. In this regard, the data frames 448 generated by data frame formatter 404 may resemble digital wrapper frames (see FIG. 1).

Frame encoder 406, which may be coupled to data frame formatter 404, is configured to receive data frames 448 (or data based on data frames 448), secondary data 432, and encoding key(s) 436. Frame encoder 406 can be optionally employed to encode data frames 448 with secondary data 432, which may represent, without limitation: OA&M overhead data, private communication channel(s), or the like. Frame encoder 406 is suitably configured to generate a stream of encoded data (encoded data frames 450 in the example embodiment) based upon the digital data stream produced by data frame formatter 404. The output of frame encoder 406 is also based upon secondary data 436 and any number of public and/or private encoding keys 436. Ultimately, the output of frame encoder 406 conveys client input data 412 via a sequence of encoded data frames 450. In the example embodiment, encoded data frames 450 may also convey secondary data 420 and secondary data 432.

In accordance with the example embodiment, frame encoder 406 comprises a digital steganographic element, and secondary data 432 comprises public and/or private digital signaling data. Frame encoder 406 may be suitably configured to encode data frames 448 with secondary data 432 such that any unauthorized attempt to locate secondary data 432 within the stream of encoded data frames 450 and, further, to identify the underlying base signaling data (i.e., the framed system overhead and client data) must employ a "hostile" data processing effort proportional to the strength of the respective encoding (encryption) algorithm. In addition, the steganographic process causes any unauthorized attempt to remove the steganographically encoded data to corrupt or destroy the foundational data frames. As described above in connection with client data encoder 402, input edge component 400 may employ known, proprietary, or future watermarking, digital signature, encoding, and/or steganographic techniques to encode data frames 448 with secondary data 432.

The frame encoding procedure performed by frame encoder 406 can be performed to "hide" information throughout the data payload and/or the system overhead portions of each data frame. Although any number of possible implementation topologies can be realized, in a practical embodiment, the output of frame encoder 406 need not have frame space allocated to FEC parity bytes. Rather, the FEC frame space allocation may be performed by the FEC encoder 408. Thus, frame encoder 406 acts upon the system overhead data and the framed client data.

The optional FEC encoder 408 may be coupled to frame encoder 406 such that it receives encoded data frames 450. FEC encoder 408 is suitably configured to add FEC data into encoded data frames 450. Any number of known FEC techniques can be employed by FEC encoder 408. As depicted in FIG. 1, the FEC data is preferably appended to the end of each row (in a byte-interleaved manner) contained in each encoded data frame 450. The output of FEC encoder 408 is a sequence of encoded data frames having optional FEC data (FEC encoded data frames 452). FEC encoder 408 can be used to insert FEC data regardless of whether frame encoder 406 is enabled.

Frame encoder 410, which may be coupled to FEC encoder 408, is configured to receive FEC encoded data frames 452 (or, if FEC encoder 408 is bypassed or disabled, data frames 448). Frame encoder 410 may also obtain secondary data 440 and encoding key(s) 444. Frame encoder 410 can be optionally employed to encode FEC encoded data frames 452 with secondary data 440. Frame encoder 410 is suitably configured to generate a stream of encoded data (encoded output data frames 454 in the example embodiment) based upon its input data stream. Ultimately, the output of frame encoder 410 conveys client input data 412 via encoded output data frames 454. In the example embodiment, encoded output data frames 454 may also convey secondary data 420, secondary data 432, and/or secondary data 440.

The above description of frame encoder 406 may also apply to frame encoder 410. For purposes of this example, secondary data 440 represents an FAS, an MFAS, private data, and/or public data. In this context, an FAS is a signal that serves to delineate individual data frames, while an MFAS is a signal that serves to delineate a multiframe consisting of a specified plurality of data frames. In a practical embodiment, the frame alignment data comprises a repeatable data pattern having a period based upon a frame length of the digital data frames processed by the respective data communication system. In this regard, the period of an FAS corresponds to the length of one data frame, while the period of an MFAS corresponds to the combined length of N data frames, where N is an integer greater than one (in the example digital wrapper embodiment, N=256).

The frame encoding procedure performed by frame encoder 410 can be performed to "hide" information throughout the data payload, the system overhead, and the FEC portions of each data frame. In the example embodiment depicted in FIG. 4, secondary data 440, which is encoded by frame encoder 410, is not covered by the FEC. Although frame encoder 406 can be used for FAS/MFAS encoding, it is desirable to maximize the number of bytes over which the alignment signals are encoded. As an example, for an OTUk compliant frame, FAS/MFAS encoding over all by the FEC area would lose about 6.25% of the available frame space (1,024 bytes). If the frame included strong FEC, then a significant amount of the available bytes would be excluded from the encoding scheme.

Figure 5:
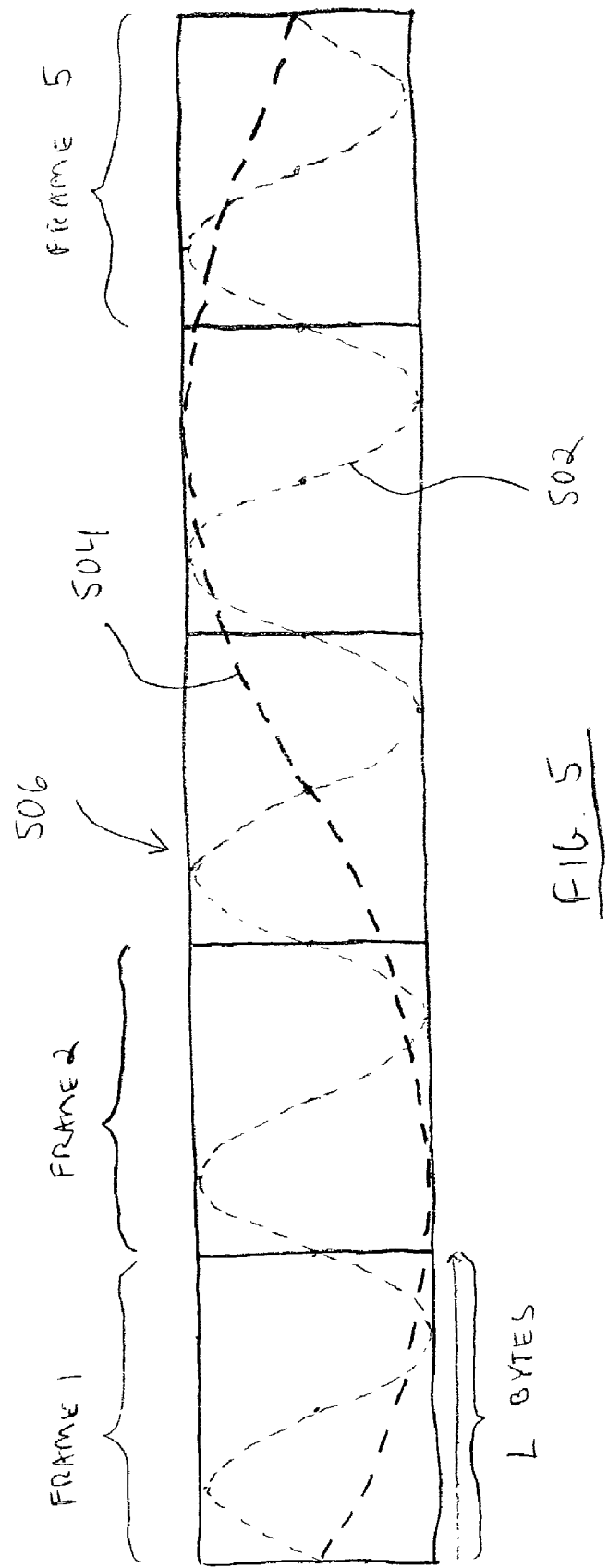
FIG. 5 is a diagram representing a frame alignment signal and a multiframe alignment signal encoded into digital data frames.

FIG. 5 is a diagram representing a frame alignment signal 502 and a multiframe alignment signal 504 encoded into digital data frames. For illustrative purposes, FIG. 5 depicts a multiframe structure 506 consisting of five data frames. A realistic multiframe structure 506 would include many more data frames, e.g., 256. In contrast to data frame structure 100 shown in FIG. 1, multiframe structure 506 represents bytes within each frame in left-to-right sequence only (i.e., not in a plurality of rows). Accordingly, each data frame includes a frame length defined by L sequential bytes. In a practical digital wrapper implementation, L=16,320, and the multiframe structure includes 256 data frames.

As described above in connection with FIG. 4, the data bytes contained in the data frames convey client input data, frame alignment signal 502, multiframe alignment signal 504, and (optionally) public/private data (not shown in FIG. 5). In other words, secondary data is encoded into and across the data frames to form a contiguous sequence of encoded digital data frames. The encoded digital data can be distributed among the data bytes using either or both in-band or out-of-band modulation techniques. In a practical embodiment, frame alignment signal 502 exhibits a repeatable pattern having a period corresponding to the frame length L. To illustrate this concept, frame alignment signal 502 is depicted as a periodic wave dispersed throughout multiframe structure 506. Multiframe alignment signal 504 exhibits a repeatable pattern having a period corresponding to the overall length of multiframe structure 506. Accordingly, multiframe alignment signal 504 is depicted as a periodic wave (only one cycle is shown) dispersed throughout multiframe structure 506.

In accordance with a practical OTN embodiment, a subset of the L bytes in each data frame is reserved for FEC data, and a subset of the L bytes in each data frame is reserved for network overhead data. Indeed, multiframe structure 506 and the individual data frames within multiframe structure 506 can be formatted in accordance (or substantially in accordance) with ITU-T Recommendation G.709/Y.1331. Unlike conventional digital wrapper data frames, however, the data frames within multiframe structure 506 are encoded with secondary data as described in more detail herein.

Repeater component 304 (see FIG. 3) receives an encoded digital data stream, and generates an equivalent encoded digital data stream for further transport in the network. In a practical embodiment, repeater component 304 may realign the incoming encoded data stream and perform FEC to compensate for channel errors. Specifics of repeater component 304 are described in detail below in connection with FIG. 8.

Figure 6:
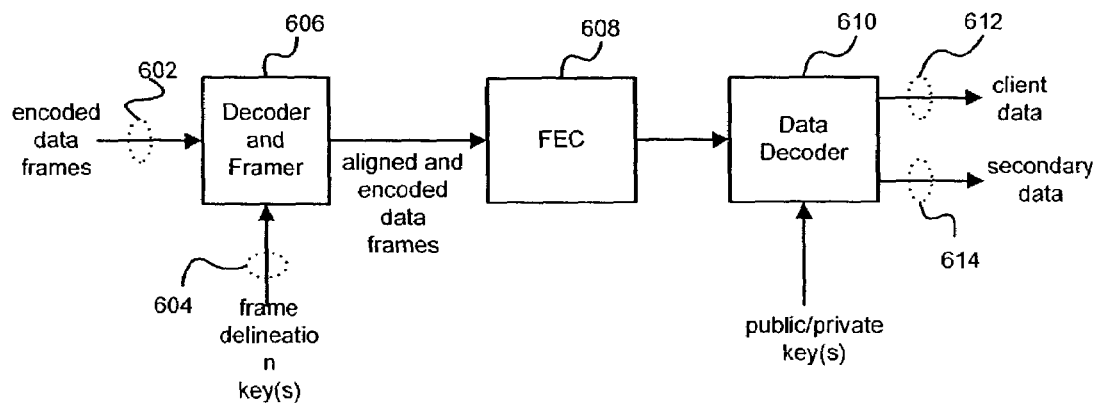
FIG. 6 is a schematic representation of an output edge component suitable for use in the data communication system shown in FIG. 3.

FIG. 6 is a schematic representation of an output edge component 600 suitable for use in data communication system 300 (output edge component 600 is not limited to use in such a data communication system, and system 300 can utilize alternately configured output edge components). Output edge component 600 generally includes an input node 602 configured to receive a sequence of encoded digital data frames, an input node 604 configured to receive one or more data decoding keys (labeled as frame delineation key(s) in FIG. 6), a decoder/framer 606, an (optional) FEC element 608, and a data decoder 610. Output edge component 600 may be realized as one or more discrete components or devices; for the sake of clarity, conventional aspects of output edge component 600 (e.g., memory elements, processor elements, logic elements, and the like) are not shown in FIG. 6. Briefly, output edge component 600 extracts frame alignment data from the encoded input data frames, aligns the data frames, performs FEC on the aligned data frames (if necessary), extracts client data from the aligned data frames, and extracts private data from the aligned data frames (if such data is present). The client data extraction procedure utilizes one or more decoding keys, and the resultant client data and private data may be output at respective output nodes 612/614.

As mentioned above, the sequence of encoded data frames received at node 602 may convey a data stream that has been encoded with secondary data such as frame alignment data, watermark data, private data, and/or public data. Decoder/framer 606 is coupled to node 602 such that it receives the encoded data frames (or data based on the encoded data frames). Decoder/framer 606 is also coupled to node 604 such that it receives one or more frame delineation keys. In practice, the frame delineation keys are public decoding keys that are utilized by decoder/framer 606 to detect and, upon successful frame alignment, extract the embedded frame alignment signal (or signals) from the input data frames. In the example embodiment where k encoding keys are used by frame encoder 410 (see FIG. 4), k decoding or frame delineation keys are used by decoder/framer 606.

Decoder/framer 606 comprises a framer configured to align data frames using the frame alignment signal. In a practical embodiment, decoder/framer 606 operates concurrently to align the resulting data frames and to extract the frame alignment signal from the incoming encoded data frames. In the example embodiment, the incoming encoded data frames convey steganographic frame alignment data, private data, and/or other digital watermark data. Consequently, the output of decoder/framer 606 represents aligned and encoded data frames with any FAS and MFAS encoding removed. In this respect, decoder/framer 606 generates aligned encoded digital data frames containing the client input data, based upon the incoming sequence of encoded digital data frames and in response to the frame delineation key(s).

Decoder/framer 606 may utilize a digital steganography and/or watermark extraction element to extract the frame alignment data from the incoming frames. Decoder/framer 606 can utilize any suitable key-based decoding, decryption, or steganographic algorithm (as described above in connection with FIG. 4) to perform the data extraction.

The aligned and encoded data frames may be provided to FEC element 608 for appropriate error correction. The corrected data frames (or data frames based upon the corrected frames) eventually serve as an input to data decoder 610. Data decoder 610 is suitably configured to extract the system overhead and/or client input data based on the aligned encoded data frames. In this respect, data decoder 610 may perform conventional deframing processes to extract client input data from the data frame structures. When applicable, data decoder 610 is also configured to first extract any secondary data based on the aligned encoded data frames and based on one or more public/private decoding keys before extracting system overhead and/or client data. As with decoder/framer 606, data decoder 610 can utilize any suitable decoding, decryption, digital watermarking, or steganographic technology to perform data extraction. In the example embodiment, the output client data represents the n original streams of data, and the secondary data represents the m streams of secondary data encoded by client data encoder 402 and the j streams of secondary data encoded by frame encoder 406 (see FIG. 4). Consequently, data decoder 610 may receive up to m different decoding keys corresponding to the m streams of secondary data, and up to j different decoding keys corresponding to the j streams of secondary data.

The encoded data frames received at input node 602' need not include traditional FAS or MFAS information. Rather, output edge device 600 can establish framing by decoding the incoming encoded data frames using an appropriate public frame delineation key. Although not shown in FIG. 6, output edge device 600 may receive incoming data frames that are encoded only with frame alignment data. In other words, a practical embodiment need not employ data decoder 610—the client output data may be extracted from aligned and decoded data frames generated by decoder/framer 606.

Figure 7:
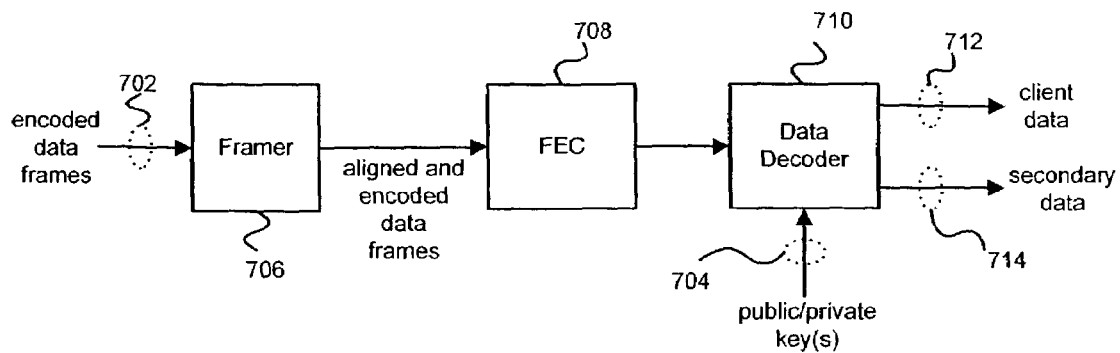
FIG. 7 is a schematic representation of another output edge component suitable for use in the data communication system shown in FIG. 3.

FIG. 7 is a schematic representation of another output edge component 700 suitable for use in data communication system 300 (output edge component 700 is not limited to use in such a data communication system, and system 300 can utilize alternately configured output edge components). Output edge component 700 performs frame synchronization according to conventional techniques and utilizes digital decoding methodologies to decode the incoming encoded data frames. Output edge component 700 generally includes an input node 702 configured to receive a sequence of encoded digital data frames, an input node 704 configured to receive one or more data decoding keys, a framer 706, an (optional) FEC element 708, and a data decoder 710. Output edge component 700 may be realized as one or more discrete components or devices; for the sake of clarity, conventional aspects of output edge component 700 (e.g., memory elements, processor elements, logic elements, and the like) are not shown in FIG. 7. Briefly, output edge component 700 aligns the incoming encoded data frames, performs FEC on the aligned data frames (if necessary), extracts client data from the aligned data frames, and extracts secondary data from the aligned data frames (if such data is present). The client data extraction procedure utilizes one or more decoding keys, and the resultant client data and private data may be output at respective output nodes 712/714.

As mentioned above, the sequence of encoded data frames received at node 702 may convey client input data that has been encoded with secondary data such as watermark data and/or private data. Framer 706 is coupled to node 702 such that it receives the encoded data frames (or data based on the encoded data frames). Framer 706 is suitably configured to align data frames using known frame synchronization techniques. In the example embodiment, the incoming encoded data frames convey a data stream encoded with private data and/or other digital watermark data. Consequently, the output of framer 706 represents aligned and encoded data frames containing the input data based upon the incoming sequence of encoded digital data frames.

The aligned and encoded data frames may be provided to FEC element 708 for appropriate error correction. The corrected data frames (or data frames based upon the corrected frames) eventually serve as an input to data decoder 710. Data decoder 710 is suitably configured to extract the client input data based on the aligned encoded data frames and based on one or more public/private keys. When applicable, data decoder 710 is also configured to extract any private data based on the aligned encoded data frames and based on one or more private decoding keys. Data decoder 710 can utilize any suitable key-based decoding, decryption, or steganographic algorithm (as described above in connection with FIG. 4) to perform the data extraction. Consistent with the example embodiment shown in FIG. 4, the output client data represents the n original streams of data, and the secondary data represents the m streams of secondary data encoded by client data encoder 402 and the j streams of secondary data encoded by frame encoder 406 (see FIG. 4). In addition, the decoding key(s) shown in FIG. 7 represent up to m different decoding keys corresponding to the m streams of secondary data, and up to j different decoding keys corresponding to the j streams of secondary data.

Figure 8:
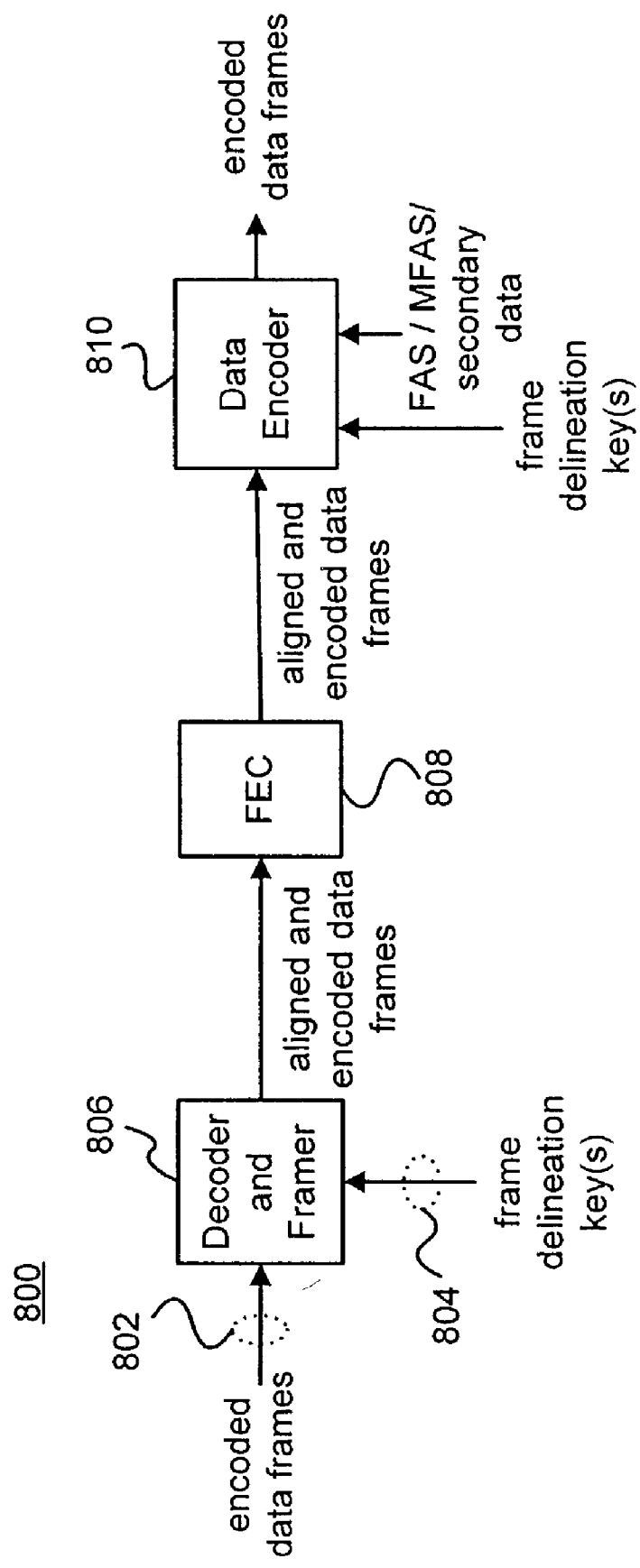
FIG. 8 is a schematic representation of a repeater component suitable for use in the data communication system shown in FIG. 3.

FIG. 8 is a schematic representation of a repeater component 800 suitable for use in data communication system 300 (repeater component 800 is not limited to use in such a data communication system, and system 300 can employ alternately configured repeater components). Certain aspects of repeater component 800 are similar or identical to corresponding features of input edge component 400 and output edge components 600/700. Accordingly, for the sake of brevity, such common features will not be described in detail in connection with repeater component 800.

Repeater component 800 generally includes an input node 802 configured to receive a sequence of encoded digital data frames, an input node 804 configured to receive one or more frame delineation keys, a decoder/framer 806, an (optional) FEC element 808, and a data encoder 810. Repeater component 800 may be realized as one or more discrete components or devices; for the sake of clarity, conventional aspects of repeater component 800 (e.g., memory elements, processor elements, logic elements, and the like) are not shown in FIG. 8. Decoder/framer 806 functions (as described above in connection with output edge component 600) to align the incoming encoded data frames. FEC element 808 receives the aligned encoded data frames (with FAS and/or MFAS removed), or data based on the aligned encoded data frames, performs an optional FEC process to compensate for transmit channel errors, and adds "new" FEC data to the aligned encoded data frames in preparation of the next transmission link. Consequently, FEC element 808 generates an output comprising a sequence of aligned and encoded data frames containing suitable FEC information.

Data encoder 810 obtains a sequence of aligned and encoded data frames, along with one or more frame delineation encoding keys and secondary data such as frame alignment data (e.g., an FAS and/or an MFAS). Data encoder 810 functions (as described above in connection with frame encoder 406 of input edge component 400) to further encode the sequence of aligned and encoded data frames with the frame alignment data, using the frame delineation key(s). In this manner, data encoder 810 restores the encoded frame alignment data embedded in the input data and generates a suitable sequence of encoded data frames for further network transmission. A practical data communication system may include any number of repeater components between the input and output edge components.

Figure 9:
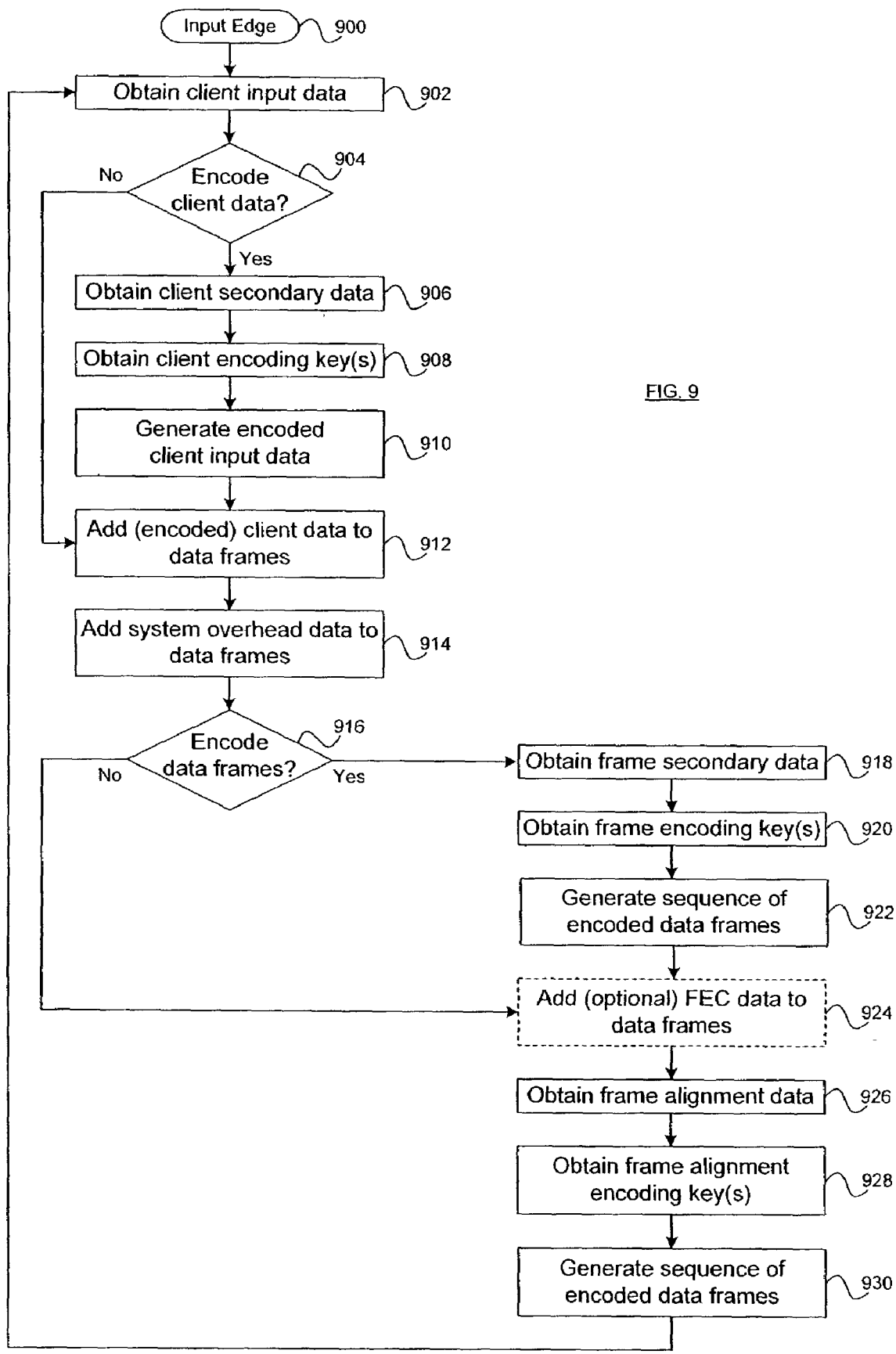
FIG. 9 is a flow diagram of an input edge process performed by an input edge component.

FIG. 9 is a flow diagram of an input edge process 900 performed by an example input edge component. Certain aspects of process 900 are described in detail above in connection with data communication system 300 and the various components of system 300. For consistency with the example embodiment, process 900 includes the encoding of secondary data into the client data, into the data frames, and into the FEC-covered data frames. A practical implementation, however, need not perform all of these encoding procedures and, therefore, portions of process 900 may be omitted during operation of an input edge component.

Process 900 can be performed to encode a continuous stream of digital data with secondary data such as watermark data, frame alignment data, private data, or the like. In this regard, process 900 begins by obtaining client input data (task 902). As mentioned above, the input edge component may receive or otherwise obtain the client input data from one or more sources in a substantially continuous manner. If the original client data is to be encoded with secondary data (query task 904), then a task 906 is performed by the input edge component to obtain the secondary data. In addition, the input edge component obtains one or more data encoding keys (task 908), which may include any number of public keys and any number of private keys. The content of the secondary data can vary depending upon the particular application and the specific purpose of the secondary data. The secondary data and encoding key(s) may be received or otherwise obtained from an external source and/or from an internal source such as a memory element. FIG. 9 refers to "client secondary data" and "client encoding keys" in the context of tasks 906 and 908 because only the original client data is encoded at this point.

The input edge component encodes the original client data with the secondary data (using the encoding key or keys) and generates a stream of encoded client data (task 910). In a practical embodiment, the encoded client data is generated as a continuous digital data stream. The encoded client data is framed to generate a sequence of data frames that convey the original client data and the secondary data (task 912). If the original client data will not be encoded with secondary data, then tasks 906, 908, and 910 are bypassed and a task 912 is performed to add the client input data to the data frame structure, thus generating a sequence of data frames that convey the original client data. In addition, process 900 adds system overhead data to the sequence of digital data frames (task 914). A working implementation may perform tasks 912 and 914 concurrently. As described above, a suitable data frame formatter may be employed in this context.

If the formatted data frames are to be encoded with secondary data (query task 916), then the input edge component performs a task 918 to obtain such secondary data. One or more frame encoding keys are also obtained (task 920) to facilitate the encoding of the data frames with the secondary data obtained during task 918. FIG. 9 refers to "frame secondary data" and "frame encoding keys" in the context of tasks 918 and 920 because the entire content of the data frames (which may include the original client data encoded with hidden information) can be encoded at this point. The input edge component generates a sequence of encoded data frames (task 922) based upon the formatted data frames and the secondary data obtained during task 918. As described above, a suitably configured element (e.g., frame encoder 406) may perform tasks 918, 920, and 922.

In a preferred practical embodiment, process 900 may add optional FEC data to the sequence of encoded data frames (task 924). In this regard, the FEC data can be generated in response to the original client data, the secondary data obtained during task 906, the system overhead data, and the secondary data obtained during task 918. Referring back to query task 916, if the formatted data frames will not be encoded with secondary data, then tasks 918, 920, and 922 are bypassed and task 924 is performed such that the FEC data can be generated in response to the original client data, the secondary data obtained during task 906, and the system overhead data.

In the example embodiment, process 900 performs frame alignment signal application to the FEC encoded data frames. In this regard, the input edge component obtains frame alignment data (task 926) such as FAS and/or MFAS data, along with one or more frame alignment encoding keys (task 928). In lieu of (or in addition to) frame alignment data encoding, process 900 may obtain additional "frame secondary data" during task 926 for encoding into the data frames. The input edge component generates a sequence of encoded output data frames (task 930) based upon the FEC encoded data frames and the frame alignment data obtained during task 926. As described above, a suitably configured element (e.g., frame encoder 410) may perform tasks 926, 928, and 930.

Assuming all of the encoding schemes are enabled, process 900 ultimately generates an encoded continuous digital data stream (task 930) based upon: the original client data, the secondary data obtained during task 906, the encoding key(s) obtained during task 908, the system overhead data, the secondary data obtained during task 918, the encoding key(s) obtained during task 920, the optional FEC data, the secondary data (e.g., FAS or MFAS data) obtained during task 926, and the encoding key(s) obtained during task 928. As mentioned above, the encoded output data stream need not resemble either the client input data, the frame data, or any of the secondary data types; the encoding procedure transforms and "combines" the client input data and the various forms of secondary data described above. In the example embodiment, a continuous sequence of encoded data frames can be generated by the input edge component for transmission over a suitable channel to a destination component.

Figure 10:
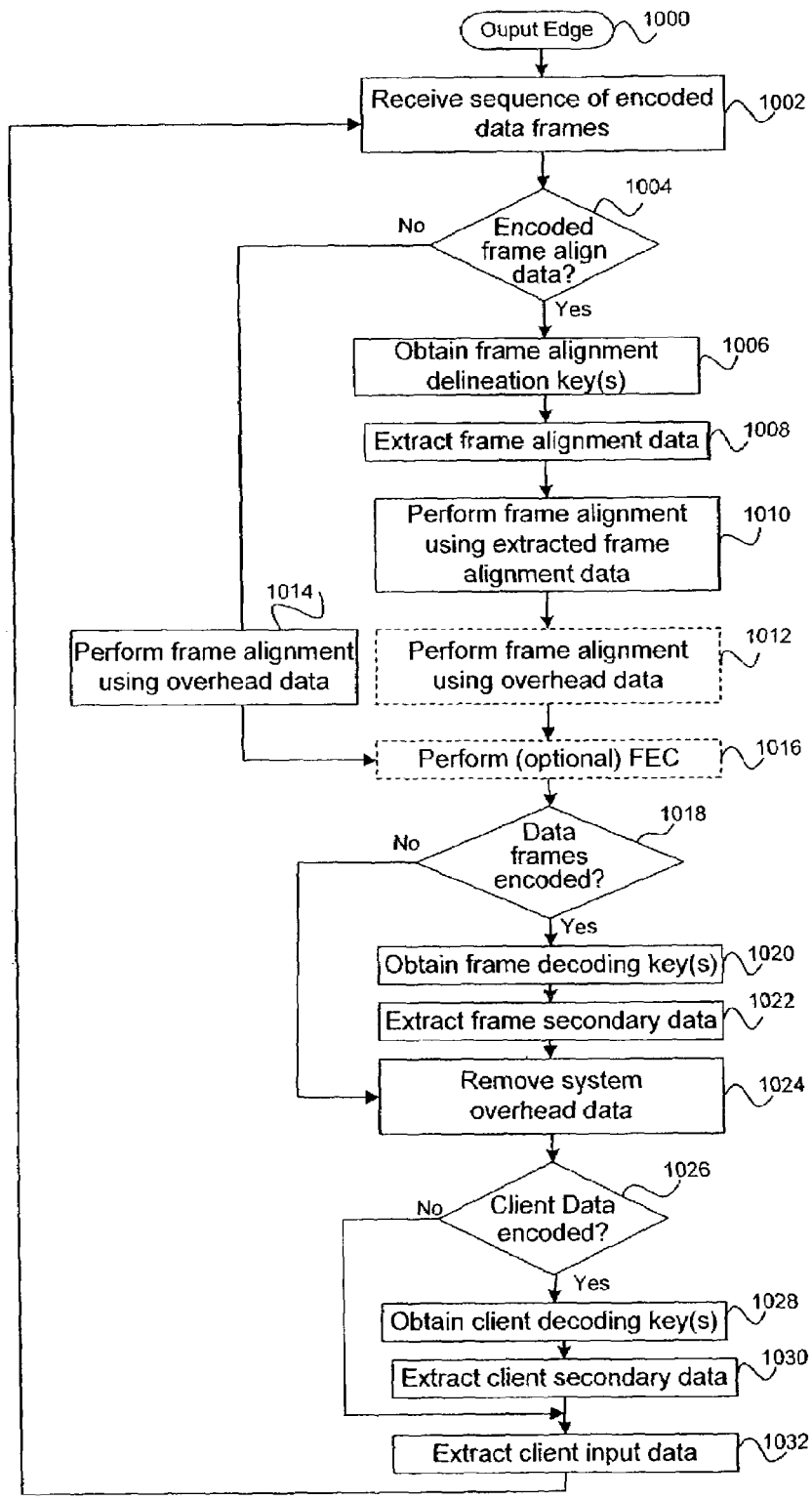
FIG. 10 is a flow diagram of an output edge process performed by an output edge component.

FIG. 10 is a flow diagram of an output edge process 1000 performed by an output edge component. Certain aspects of process 1000 are described in detail above in connection with data communication system 300 and the various components of system 300. Process 1000 can be performed to process a stream of digital data encoded with hidden information and to extract the encoded secondary data from the data stream. As described above, the output edge component may utilize the extracted data to perform frame alignment or other network overhead functions. For consistency with the example embodiment, process 1000 involves the decoding of data frames generated in accordance with process 900. A practical implementation, however, need not perform all of the decoding procedures and, therefore, portions of process 1000 may be omitted during operation of an output edge component Output edge process 1000 begins by receiving a stream of encoded digital data, e.g., a sequence of encoded data frames (task 1002). In the example embodiment, the sequence of encoded data frames conveys client input data, which may be encoded with secondary data and/or "frame secondary" data such as frame alignment data, public data, and/or private data. If the incoming sequence of data frames is encoded with frame alignment data (query task 1004), then a task 1006 is performed to obtain one or more frame delineation decoding keys. The frame delineation key(s) may be received or otherwise obtained from an external source and/or from an internal source such as a memory element. The frame delineation key(s) correspond to the encoding key employed by the input edge component when encoding the frame alignment information into the client data.

The frame delineation key enables the output edge component to frame align the incoming sequence of encoded data frames. In this regard, output edge process 1000 extracts the frame alignment data from the sequence of encoded digital data frames (task 1008), using the frame delineation keys. In this manner, process 1000 can perform frame alignment (task 1010) using the extracted frame alignment data, resulting in a sequence of aligned and possibly encoded data frames containing the client input data. In this context, the framing is based upon the sequence of encoded data frames and the frame delineation key(s). In a practical embodiment, tasks 1008 and 1010 are performed concurrently such that the output edge component extracts the encoded frame alignment information while performing frame synchronization. Thus, task 1010 generates the aligned encoded data frames in response to the extracted frame alignment data. The output edge component may perform an optional task 1012 to perform frame alignment using frame alignment data contained in the system overhead portion of the received data frames. Task 1012 enables the output edge component to leverage conventional frame alignment techniques.

If the incoming sequence of data frames is not encoded with frame alignment data (query task 1004), then the output edge component may perform a task 1014 in lieu of tasks 1006, 1008, 1010, and 1012. During task 1014, the output edge component performs frame alignment using frame alignment data contained in the system overhead portion of the received data frames. In other words, the output edge component can utilize conventional frame alignment procedures to align data frames encoded with secondary data other than frame alignment data. In this context, task 1014 may utilize techniques compliant with ITU-T Recommendation G.709/Y.1331 to detect an FAS and/or an MFAS. The different framing options are depicted together in FIG. 10 for ease of illustration. A practical embodiment may only employ one of the two framing methodologies. Alternatively, a practical embodiment may perform separate processes, each devoted to handling one of the two frame alignment techniques. With regard to the use of either framing option, network system components can be configured through network administration to frame delineate using the appropriate combination of methodologies.

In a practical embodiment, the frame alignment procedures are performed until frame alignment has been achieved. Assuming that process 1000 has obtained frame alignment, then, the aligned sequence of data represents encoded frame data with (optional) FEC data. Within the encoded frame data resides system overhead data and client input data (optionally) encoded with secondary data such as private data, public data, and/or other watermark information.

As an optional procedure, the output edge component may perform FEC (task 1016) to remove channel errors from the aligned and encoded frame data. As mentioned above, use of an encoded frame alignment signal enables data communication system to perform well with highly erred channels, assuming that strong FEC is applied. If the data frames are encoded (query task 1018), then output edge process 1000 obtains one or more frame decoding keys (task 1020) corresponding to one or more frame encoding keys employed by the input edge device when encoding frame secondary data, e.g., private data and/or public data, into the data frame. These frame decoding keys may be received or otherwise obtained from an external source and/or from an internal source such as a memory element. Using suitable decoding algorithm(s) and the frame decoding key(s), the output edge component extracts the frame secondary data from the sequence of aligned encoded data frames (task 1022). A task 1024 may also be performed to remove the system overhead data from the aligned data frames. In the example embodiment, task 1024 is performed after the frame secondary data is extracted. If query task 1018 determines that the data frames are not encoded, then tasks 1020 and 1022 are bypassed.

If the client data itself is encoded (query task 1026), then output edge process 1000 obtains one or more client data decoding keys (task 1028) corresponding to one or more client data encoding keys employed by the input edge component when encoding the original client data with secondary data. These decoding keys may be received or otherwise obtained from an external source and/or from an internal source such as a memory element. Using suitable decoding algorithm(s) and the client data decoding key(s), the output edge component extracts the secondary data from the client data (task 1030). In addition, the output edge component extracts or otherwise processes the original client input data (task 1032) from the current data frame.

In a practical embodiment, the original client input data can be encoded with any number of secondary data patterns/signals using any number of encoding keys. The output edge component, having knowledge of the corresponding decoding keys, can extract the different types of secondary data and identify the original client data. Using the data frame steganography, coding, and/or watermarking techniques described herein, repeater components (and/or other network components) located between the input edge device and the output edge device can be given hierarchical rights to decode/encode specified data encoded into the data frames and/or the client input data. Consequently, highly sensitive or confidential information can be securely transported through the network with the assurance that only the intended output edge component can decode the data frames. On the other hand, the system may allow many devices to access and process encoded overhead or signaling information (such as frame alignment data). The types of encoded secondary data, the purposes of such secondary data, and the designation of access "classes" or "levels" can vary depending upon the practical application and system environment.

The present invention has been described above with reference to a preferred embodiment. However, those skilled in the art having read this disclosure will recognize that changes and modifications may be made to the preferred embodiment without departing from the scope of the present invention. For example, unless otherwise expressly stated, the process tasks described herein need not be performed in any particular order, and, in practice, the processes shown and described herein may include any number of alternative or additional tasks. Furthermore, unless otherwise expressly stated, the use of reference terms such as "first node" and "second node" do not imply any chronological order, priority, relative importance, physical placement, functional significance, or the like. These and other changes or modifications are intended to be included within the scope of the present invention, as expressed in the following claims.

What is claimed is:

1. A data communication apparatus comprising:
   a data frame formatter configured to receive client input data and to generate a sequence of data frames compliant with optical transport networks based upon said client input data; and
   an encoder configured to receive said sequence of data frames, secondary data, and one or more encoding keys, said encoder generating a sequence of encoded data frames based upon said sequence of data frames, said secondary data, and said one or more encoding keys.

2. A data communication apparatus according to claim 1, wherein said client input data comprises encoded client input data that conveys client secondary data.

3. A data communication apparatus according to claim 1, wherein said encoder comprises a digital watermarking element, and said secondary data comprises digital watermark data.

4. A data communication apparatus according to claim 1, further comprising a forward error correction (FEC) element configured to insert FEC data into said encoded data frames.

5. A data communication apparatus according to claim 1, wherein said secondary data comprises frame alignment data.

6. A data communication apparatus according to claim 5, wherein said frame alignment data comprises a repeatable pattern having a period based upon a frame length of said data frames.

7. A data communication apparatus according to claim 6, wherein said period corresponds to the length of one of said data frames.

8. A data communication apparatus according to claim 6, wherein said period corresponds to the combined length of a plurality of said data frames.

9. A data communication apparatus comprising:
   a decoder/framer configured to receive encoded data frames formatted for compliance with optical transport networks and conveying client input data and frame alignment data, to receive one or more decoding keys, to extract said frame alignment data from said encoded data frames, and to generate, in response to said encoded data frames and said one or more decoding keys, aligned data frames containing said client input data; and
   a data decoder configured to receive data frames based upon said aligned encoded data frames, and to extract said client input data from said data frames.

10. A data communication apparatus according to claim 9, wherein said encoded data frames also convey client secondary data.

11. A data communication apparatus according to claim 10, wherein said data decoder is further configured to receive one or more decoding keys, and to extract said client secondary data based on said data frames and said one or more decoding keys.

12. A data communication apparatus according to claim 9, wherein said frame alignment data comprises a repeatable pattern having a period based upon a frame length of said encoded data frames.

13. A data communication apparatus according to claim 12, wherein said period corresponds to the length of one of said encoded data frames.

14. A data communication apparatus according to claim 12, wherein said period corresponds to the combined length of a plurality of said encoded data frames.

15. A data communication apparatus comprising:
   a framer configured to receive encoded data frames formatted for compliance with optical transport networks containing client input data encoded with secondary client data, and to generate aligned encoded data frames based on said encoded data frames; and
   a data decoder configured to receive data frames based upon said aligned encoded data frames, to receive one or more decoding keys, and to extract said client secondary data based on said aligned encoded data frames and said one or more decoding keys.

16. A data communication apparatus according to claim 15, wherein said data decoder is further configured to extract said client input data based on said aligned encoded data frames and said one or more decoding keys.

17. A data communication apparatus according to claim 15, wherein said data decoder comprises a digital watermark extraction element, and said aligned encoded data frames convey said secondary data as digital watermark data.

18. A data communication method comprising:
obtaining client input data, frame alignment data, and one or more encoding keys;
said frame alignment data including a repeatable pattern having a period based upon a frame length of said data frames;
framing said client input data into a sequence of data frames; and
generating an encoded sequence of data frames based upon said sequence of data frames, said frame alignment data, and said one or more encoding keys.

19. A method according to claim 18, further comprising adding forward error correction data to said sequence of data frames.

20. A method according to claim 18, further comprising adding overhead data to said sequence of data frames.

21. A method according to claim 18, wherein said period corresponds to the length of one of said data frames.

22. A method according to claim 18, wherein said period corresponds to the combined length of a plurality of said data frames.

23. A method according to claim 18, further comprising:
receiving said encoded sequence of data frames;
extracting said frame alignment data from said encoded sequence of data frames, using one or more decoding keys; and
generating a decoded sequence of data frames containing said client input data, using said one or more decoding keys.

24. A method according to claim 23, further comprising extracting said client input data from said decoded sequence of data frames.

25. A data communication method comprising:
receiving a sequence of encoded data frames, said sequence of encoded data frames conveying client input data, and said sequence of encoded data frames formatted for compliance with optical transport networks;
obtaining one or more decoding keys;
generating a sequence of aligned encoded data frames from said sequence of encoded data frames; and
extracting said client input data from said sequence of aligned encoded data frames, using said one or more decoding keys.

26. A method according to claim 25, wherein:
said sequence of encoded data frames also conveys secondary data; and
said method further comprises extracting said secondary data from said sequence of aligned encoded data frames, using said one or more decoding keys.

27. A data communication method comprising:
receiving a sequence of encoded data frames, said sequence of encoded data frames conveying client input data and frame alignment data, and said sequence of encoded data frames formatted for compliance with optical transport networks;
obtaining one or more decoding keys;
extracting said frame alignment data from said sequence of encoded data frames, using said one or more decoding keys; and
generating a sequence of aligned encoded data frames containing said client input data, based upon said sequence of encoded data frames and said one or more decoding keys.

28. A method according to claim 27, further comprising extracting said client input data based on said sequence of aligned encoded data frames.

29. A method according to claim 27, wherein said generating step aligns said sequence of encoded data frames in response to said frame alignment data.

30. A data communication apparatus comprising:
a data frame formatter configured to receive client input data and to generate a sequence of encoded data frames based upon said client input data; and
an encoder configured to receive said sequence of data frames, frame alignment data having a repeatable pattern with a period based upon a frame length of said data frames, and one or more encoding keys, said encoder generating a sequence of encoded data frames based upon said sequence of data frames, said frame alignment data, and said one or more encoding keys.

31. A data communication apparatus according to claim 30, wherein said period corresponds to the length of one of said data frames.

32. A data communication apparatus according to claim 30, wherein said period corresponds to the combined length of a plurality of said data frames.

* * * * *